July 4, 1967

R. H. HUGGER 3,329,748

PROCESSES OF CURING TIRES

Filed Feb. 4, 1963

INVENTOR.
RICHARD H. HUGGER
BY
Harvey E Bumgardner Jr
ATTORNEY

July 4, 1967 R. H. HUGGER 3,329,748
PROCESSES OF CURING TIRES
Filed Feb. 4, 1963 5 Sheets-Sheet 2

INVENTOR.
RICHARD H. HUGGER
BY
Harvey E Bumgardner Jr.
ATTORNEY

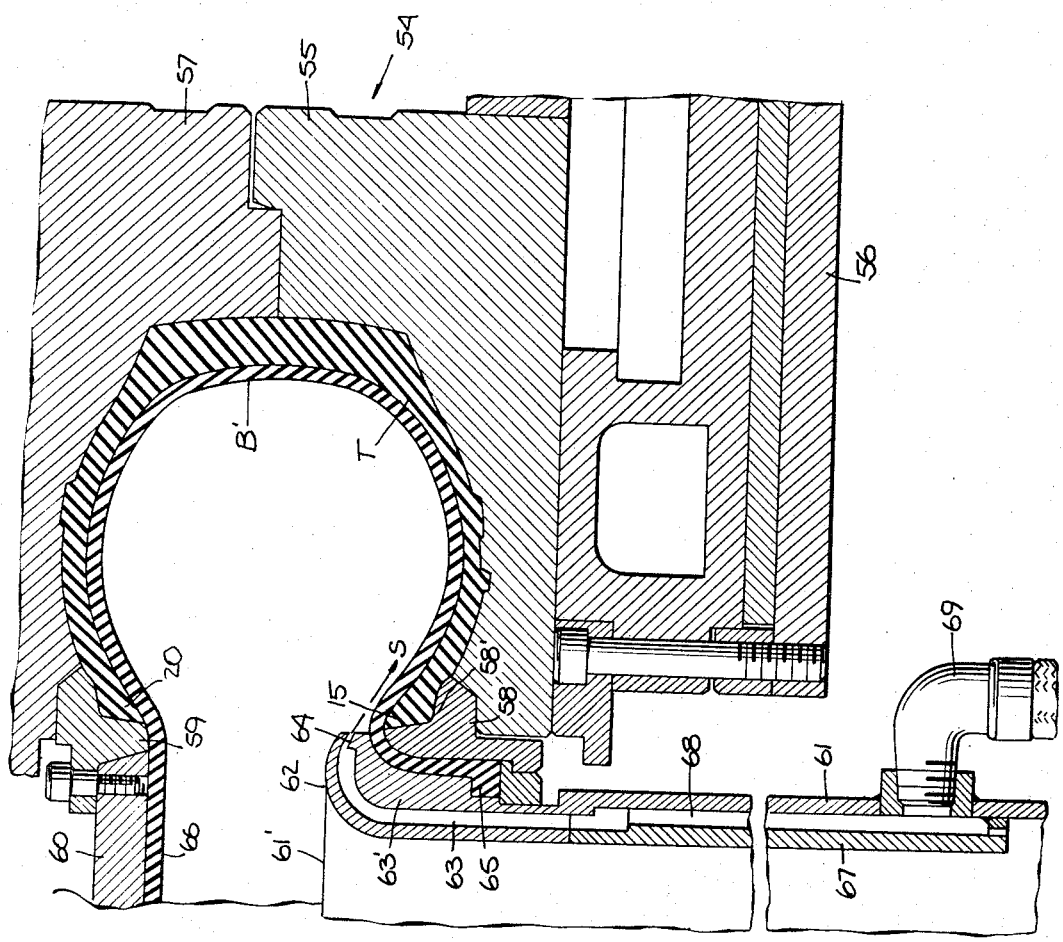

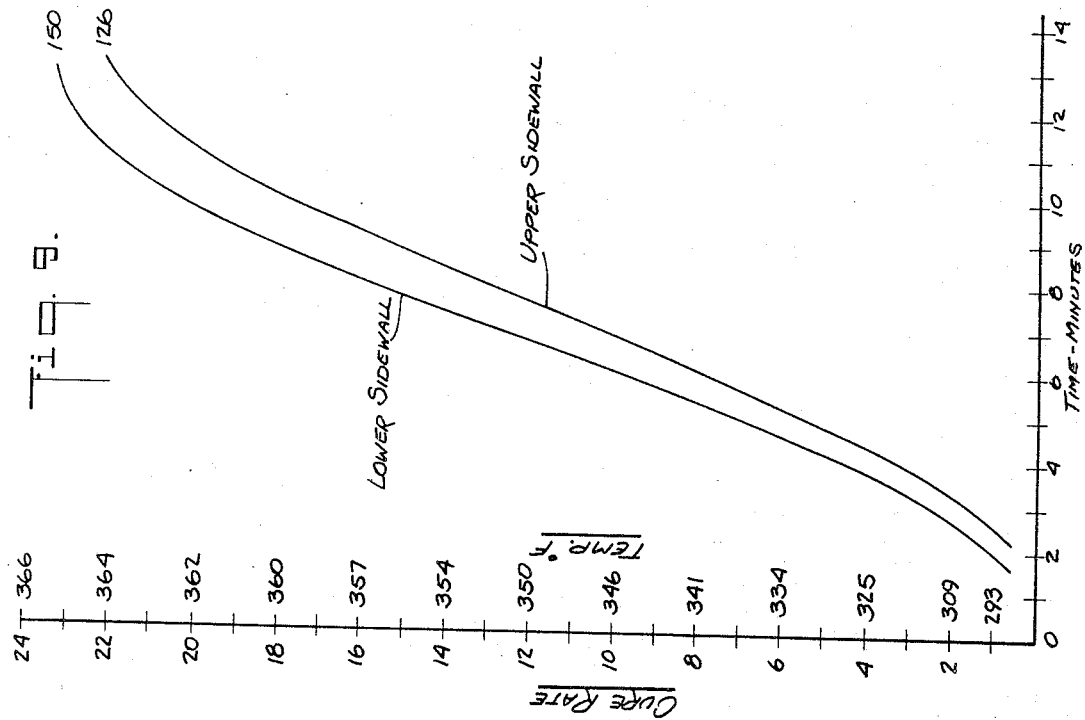
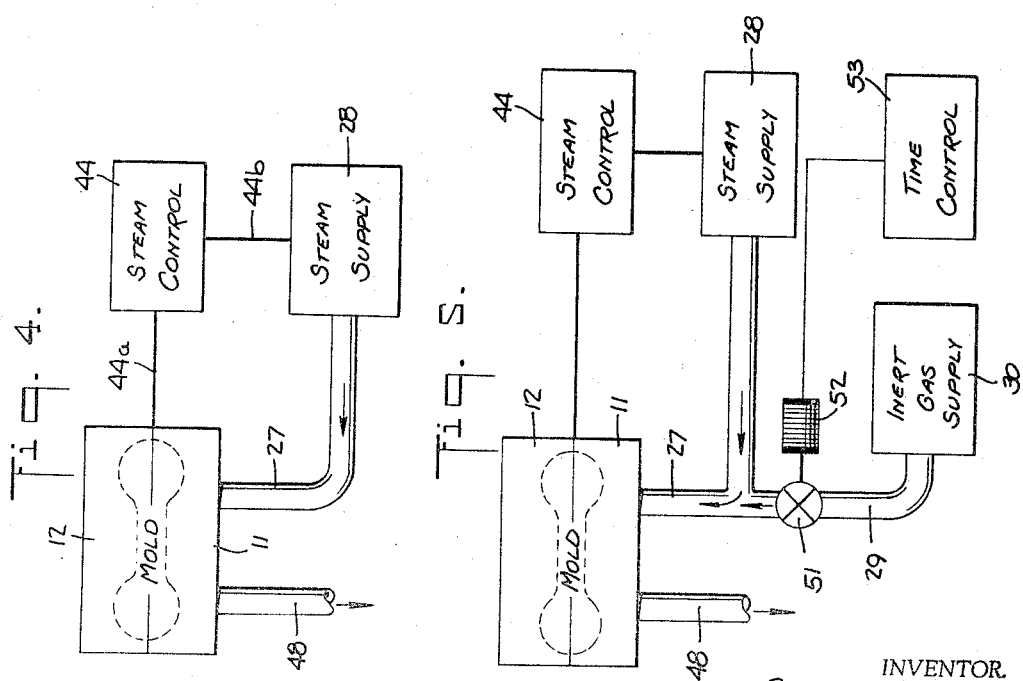

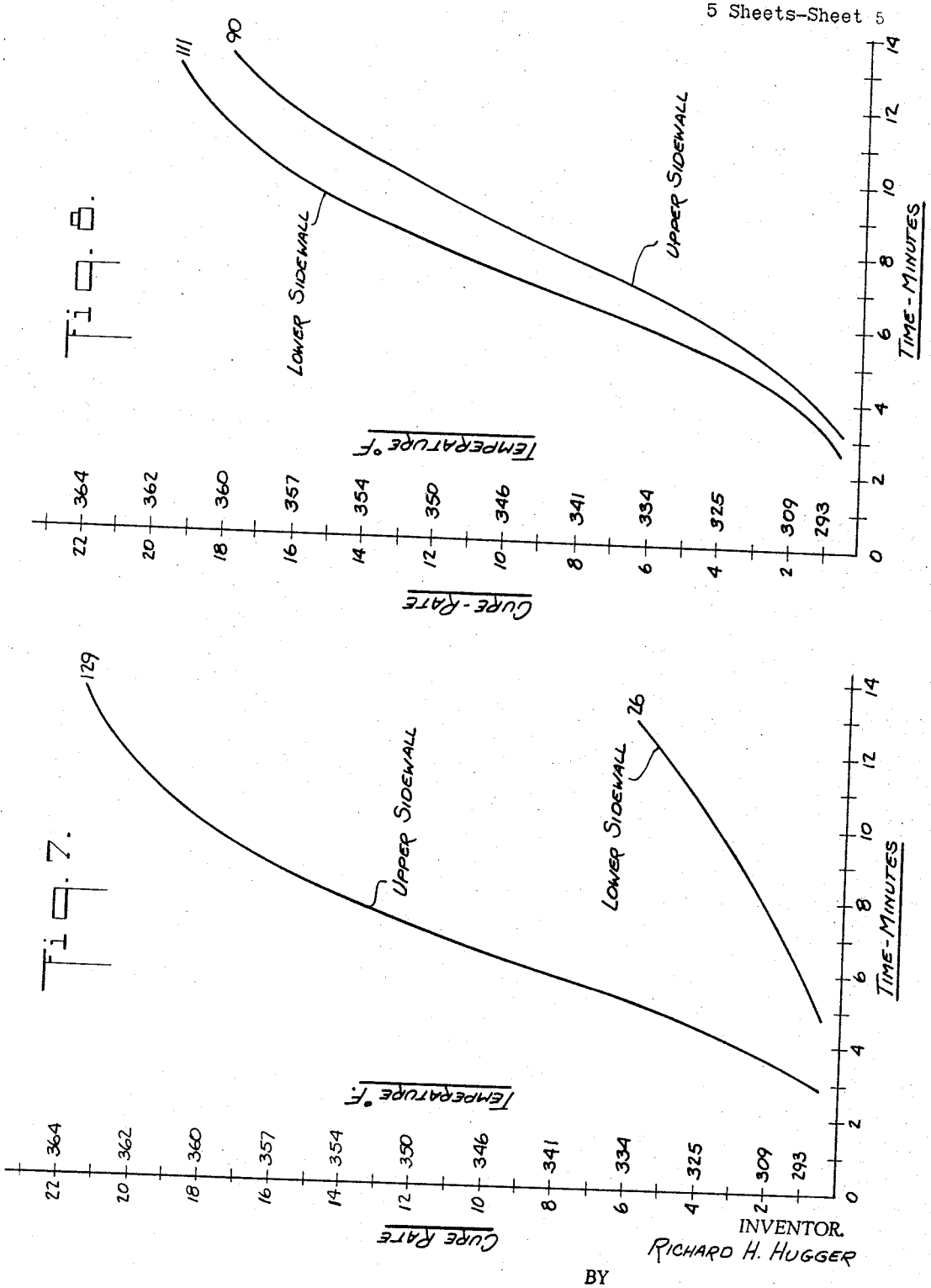

3,329,748
PROCESSES OF CURING TIRES
Richard H. Hugger, Ridgewood, N.J., assignor to Uniroyal, Inc., a corporation of New Jersey
Filed Feb. 4, 1963, Ser. No. 255,823
7 Claims. (Cl. 264—40)

This invention relates to the art of manufacturing pneumatic tires, and in particular to processes of curing such tires.

There are presently available to the tire industry several types of presses in which raw tire bands are shaped and cured to final form. Most commonly, there are provided in these presses separable upper and lower mold halves, of which the lower one is usually stationary while the upper one is adapted to be moved toward and away from the lower mold half, and a vertical, centrally located curing bladder one end of which is clamped to the lower mold half and the other end of which is closed so that its interior is sealed fluid-tight. This enables a heat transfer medium, either hot water or steam, to be admitted into the bladder under high pressure when the mold is closed, which conforms the tire to the interior contours of the mold, while at the same time the tire is cured by the heat of the heat transfer medium acting through the walls of the bladder in conjunction with heat applied to the mold exteriorly of the tire.

One of the major problems which has attended the use of such presses has been the difficulty of precisely controlling the temperature conditions at all points of the interface between the curing bladder and the tire. The problem is especially acute in connection with the steam curing of tires. It is well known that during each steam curing cycle, condensate collects in the lower portion of the curing bladder, i.e. that portion which contacts the lower sidewall of the tire, which prevents the lower sidewall from becoming uniformly heated, due to the reduction in heat transfer caused by the collected condensate. Moreover, after any steam cure cycle in the press, as the cured tire is being stripped from the press and the next uncured tire inserted into the press, a substantial amount of steam condenses in the steam supply line, so that when the press is subsequently closed and the steam supply line reopened, a quantity of water is injected into the curing bladder ahead of the steam. This water not only is not sufficiently hot to effect the desired cure, but since it also collects in the lower half of the curing bladder it tends to interfere with the control of the cure in the lower sidewall of the tire in the same manner as and in conjunction with the condensate subsequently formed from the steam injected into the curing bladder.

Attempts have been made to overcome these difficulties by causing the steam to swirl through the curing bladder. To this end, it has been proposed to provide in the clamping structure for the bottom end of the curing bladder a plurality of upwardly angled, non-radial passageways spaced from one another circumferentially of the curing bladder. The steam admitted through such passageways is thereby caused to travel arcuately through the interior of the tire, impinging first against that portion of the bladder which contacts the upper sidewall of the tire and then flowing down past the tread portion and over the bladder portion which contacts the lower sidewall. It was believed that this arrangement would not only serve to make the active steam temperature in any given sector of the tire more uniform, but also that the swirling steam would entrain the collected condensate into a similar swirling motion around the interior of the curing bladder so as to reduce the insulating effect of this condensate.

This procedure has not, however, found any substantial acceptance in the tire industry. Although other factors may be involved, it is believed that the principal reason for the industry's reluctance in this respect is that the steam, when so admitted into the bladder, may not be sufficiently efficacious as far as dispersal of condensate is concerned. This will best be understood from the following. Consideration of the kinetic energy requirements involved makes it clear that the desired circulation and dispersal of the accumulated condensate depend on the flow velocity of the steam incident thereonto. In the aforesaid known procedure, the maximum steam flow velocity is directed upwardly. Thus, by the time the steam has traversed those parts of the bladder surface which are coextensive with the upper sidewall and the tread portion of the tire, it has lost a considerable part of its velocity and kinetic energy. Accordingly, the steam is no longer capable of effecting the complete dispersal of the condensate pool, and at the same time the steam is not even capable of dispersing any film of condensate which may have formed or remain on the bladder surface. The presence of undisturbed or insufficiently dispersed condensate is inimical to the curing operation because wherever such condensate covers any given increment of area of the inner surface of the curing bladder, it interferes with the heat transfer through that increment of area.

Moreover, in the known presses the steam is admitted until the pressure in the bladder reaches a predetermined value. Since for saturated steam there is a given temperature to correspond to any given steam pressure, and since there is a practical limit to the temperature which can be permitted in the bladder, it happens frequently that the pressure in the bladder is not sufficiently high to effect a satisfactory cure. Small quantities of air or other gaseous fluids may, consequently, remain trapped between the tire carcass and the rubber sidewall and tread stocks, leading to the formation of more or less defective tires. This disadvantage cannot be overcome by permitting a substantial increase in the steam pressure, inasmuch as that would entail a corresponding temperature rise which would result in overcuring and a possible scorching or degrading of the rubber.

It is an important object of the present invention, therefore, to provide processes of steam curing tires in a manner capable of overcoming the aforesaid drawbacks and disadvantages of known curing procedures.

It is another object of the present invention to provide a steam cure for pneumatic tires in which the admission of steam into the curing bladder is precisely regulated over the entire course of the curing cycle.

It is also an object of the present invention to provide a steam cure as aforesaid in which the steam is regularly pulsed into the curing bladder in response to the temperature conditions of the heating fluid already in the bladder.

A further object of the present invention is the provision of a steam cure as aforesaid in which at a predetermined point in the curing cycle there is introduced into the bladder a regulated quantity of an inert and non-condensable gas for the purpose of raising the pressure existing within the bladder without any corresponding increase in temperature that would occur if the pressure of the saturated steam were raised.

Still a further object of the present invention is the provision of processes of steam curing tires whereby the cured tires are at much lower temperatures at the ends of the curing cycles than has heretofore been possible, all without the reduction in bladder pressure that is normally necessary to accomplish this when steam is the heat transfer medium; thereby reducing the possibility of moisture in the carcass cords becoming vaporized and causing delamination of the plies when the curing pressure is relieved with the opening of the mold.

Yet another object of the present invention is the provision of tire curing processes which result in substantial economies and increased productivity in the manufacture of tires, thereby lowering the cost of tires while simultaneously improving their quality.

Broadly speaking, the objects of the present invention are attained by the introduction of the steam into the interior of the curing bladder along a plurality of passageways or nozzles which are angled downwardly toward that portion of the bladder which contacts the lower sidewall of the tire. The downward inclination of these nozzles is such that the steam jets emanating therefrom flow along respective paths which are substantially tangent to the corresponding points of inflection between the convex curvature of the lower bead and the concave curvature of the lower sidewall, i.e. to the region of confluence of the lower bead and sidewall, of the tire being cured, so as to be directed precisely into the area in which condensate normally tends to collect. The influx of steam takes place at a predetermined high velocity which enables the jets to disperse thoroughly any collected condensate, whether in the form of a pool or film, so as to blow it immediately away from the surface on which it would normally rest so that it will not remain in stagnant contact with any portion of the bladder. The regulation of the admission of steam may be achieved either by sensing the steam pressure in the bladder or by providing in a suitable location at least one temperature-responsive element that will indicate bladder cavity temperature. In accordance with one aspect of the present invention, the source of supply of the steam may be kept under a pressure about 20 p.s.i.g. or more higher than the bladder pressure, so that the steam is pulsed into the bladder whenever the temperature in the bladder varies from a set value.

Preferably, the steam nozzles are oriented not only downwardly but also non-radially relative to the bladder, so that the fluids in the same are circulated therethrough with a motion having both circumferential and radial components. Alternatively, the downwardly angled steam nozzles may be oriented radially of the bladder, this arrangement being suitable for a system in which the circumferential component of motion of the hot fluids in the bladder is not an indispensable requirement.

The foregoing and other objects, characteristics and advantages of the present invention will be more fully understood from the following detailed description thereof when read in conjunction with the accompanying drawings, in which:

FIG. 3 is a fragmentary, partly schematic, vertical sectional view of a closed mold of another known type of press the structure of which is modified in accordance with the principles of the present invention;

FIG. 4 is a block diagram illustrating the basic processes of curing tires in accordance with the present invention;

FIG. 5 is a block diagram illustrating somewhat modified processes of curing tires in accordance with the present invention;

FIG. 7 is a graph of temperature and cure rate against time for a steam curing operation conducted in accordance with the prior art processes; and FIGS. 8 and 9 are graphs similar to FIG. 7 and illustrate the advantages accruing from tire curing operations according to the present invention.

Figure 1:
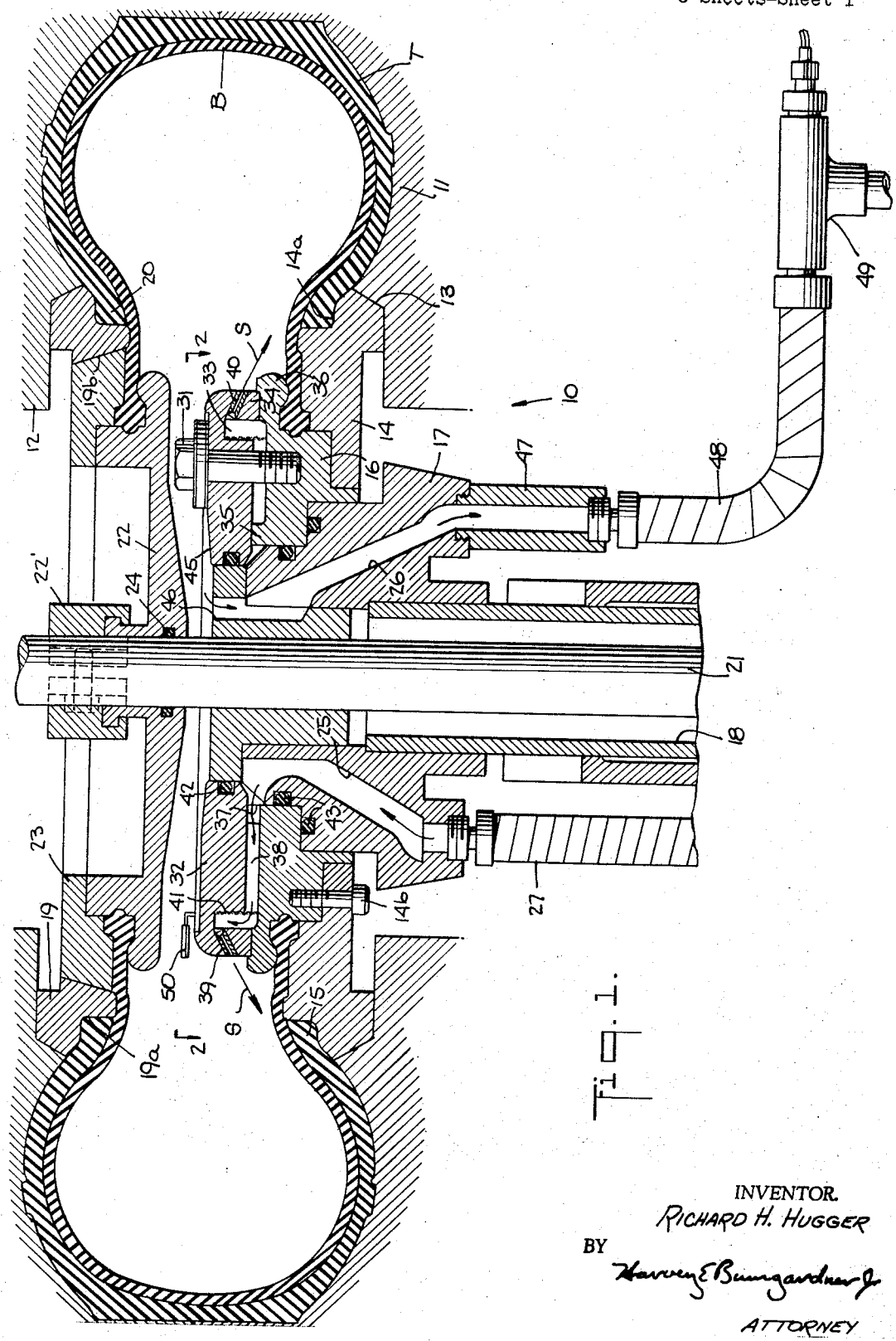
FIG. 1 is a fragmentary, partly schematic, vertical sectional view of a closed mold of one known type of tire press and illustrates the structural details thereof involved in the practice of the processes according to the present invention.
Figure 2:
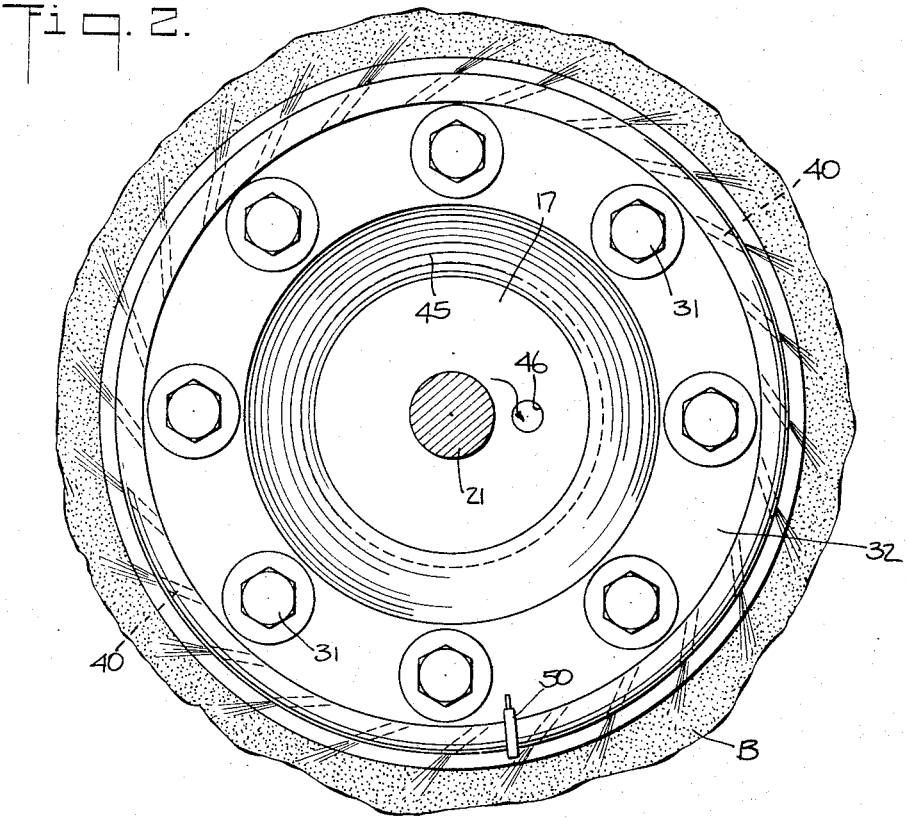
FIG. 2 is a sectional view taken along the line 2—2 in FIG. 1.

Referring first to FIGS. 1 and 2, there is shown a part of a "clam-shell" tire press 10 of the type manufactured and sold by the McNeil Machine & Engineering Company under the trademark "Bag-O-Matic." This press includes a mold composed of separable mold halves 11 and 12. The lower mold half 11 is normally stationary on the base (not shown) of the press, and the upper mold half 12 is supported above the lower mold half 11 for movement toward and away from the latter under the action of suitable and conventional drive means and linkages (not shown). The lower mold half 11 defines an annular shouldered seat 13 for a lower bead ring 14 which is provided with an upwardly facing, annular, arcuate shoulder 14a defining the seat for the lower bead 15 of the tire T being cured. The lower bead ring 14 is secured in any suitable manner, as by bolts 14b, to a lower clamping ring 16 the function of which will be more fully referred to hereinafter. The clamping ring 16 is secured to and carried by a hub structure 17 which is connected to a vertically displaceable shaft 18 mounted for limited vertical reciprocal movement relative to the lower mold half 11 for a purpose which will also be more fully explained hereinafter.

The upper mold half 12 has secured to its inwardly or downwardly directed face an upper bead ring 19 which is provided with a downwardly facing, annular, arcuate shoulder 19a defining the seat for the upper bead 20 of the tire T. The inner surface 19b of the upper bead ring 19 tapers in an upward direction. Extending upwardly from the press base and vertically slidable through the hub structure 17 is a shaft or post 21 to which, adjacent the upper end region thereof, is secured an upper clamping ring composed of two annular members 22 and 23. The clamping member 22 is fixedly connected by means of a split ring 22' to the shaft 21, while the second clamping member 23, which is also disposed concentrically about the shaft 21, is secured to the top of the member 22. An annular groove at the inner face of the clamping member 22 houses a rubber O-ring or like gasket 24 to provide a fluid-tight seal between the saft 21 and the member 22.

The members 22 and 23 of the upper clamping ring cooperate with one another at their respective peripheries to clamp and secure therebetween the upper end of a highly extensible rubber curing bladder or diaphragm B the lower end of which is clamped between the upper surface of the lower bead ring 14 and the adjacent lower surface of the lower clamping ring 16. The arrangement is such that when the press is open, upon retraction of the upper mold half 12 from the lower mold half 11, the shaft 21 may be moved upwardly by any suitable mechanism (not shown) until the bladder B assumes a substantially cylindrical outline. As clearly shown in FIG. 1, the outer peripheral surface of the clamping member 23 tapers upwardly and thus is mated to the inner surfaces 19b of the upper bead ring 19. This arrangement enables the bladder and the raw tire band surrounding the same to be automatically centered when the upper bead ring 19, upon descending with the upper mold half 12, engages the clamping member 23. As a result, the upper bead 20 of the tire band is properly positionde for engagment by the shoulder 19a of the bead ring 19.

The hub structure 17 is provided with two internal bores or passageways 25 and 26 extending upwardly through the said structure. The lowermost end of the bore or passageway 25 is connected by any suitable fitting to a flexible conduit 27 which in turn communicates with a supply 28 (see FIGS. 4 and 5) of high pressure steam and, in accordance with one embodiment of the invention, also with a conduit 29 leading to a supply 30 of an inert or non-condensable gas.

Suitable affixed by means of bolts 31 to the lower bladder clamping ring 16 and positioned above the upper surface of the latter is an annular plate 32 which is substantially coextensive with the clamping ring 16. The inner peripheral surface of the plate 32 is in flush contact with the uppermost outer peripheral surface of the hub structure 17. The plate 32 is provided at its underside adjacent its outermost edge with a circumferentially extending and downwardly opening groove or channel 33, and the bottom edge plane of the flange 34 (which defines the outer boundary of the groove 33) is disposed somewhat below the plane o fthe lower surface of the body of the plate (which defines the inner boundary of the said groove). The upper surface of the lower clamping ring 16 is downwardly recessed between an upwardly extending, annular inner flange 35 and an outer, annular seat-defining flange 36. The heights of these flanges are such that when the plate 32 is secured to the clamping ring 16, the flange 34 of the plate rests on the seat defined by the flange 36 of the ring, while the flange 35 of the latter engages the bottom surface of the central body portion of the plate.

The flange 35 is provided with an opening 37 which establishes communication between the bore 25 and the annular chamber 38 defined between the lower surface of the plate 32 and the upper surface of the clamping ring 16. The chamber 38 further communicates with the lowermost end of the groove 33. In the peripheral flange 34 of the plate 32 is provided a plurality of bores 39 which are angled downwardly relative to the horizontal in a manner more specifically set forth below and are spaced equidistantly around the plate. Positioned within each of these bores is a nozzle-defining insert 40 having a central passageway of predetermined diameter establishing communication between the groove 33 and the interior of the curing bladder B. The chamber 38 and groove 33 together thus constitute a manifold for the nozzles 39-40. Entry of foreign matter into the nozzles is prevented by means of an annular filter screen 41 positioned around the inner boundary wall of the groove 33 and extending down to the bottom of the chamber 38. Suitably positioned rubber O-rings or like gaskets 42 and 43 effect a fluid-tight seal between the hub structure 17 on the one hand and the plate 32 and clamping ring 16 on the other.

From the foregoing it will be seen that the plate 32 defines a distributor arrangement by means of which the curing steam (or other gaseous fluid as will hereinafter be explained more fully) may be admitted into the interior of the curing bladder B. The nozzles are oriented in such fashion that the projection of the axis of each on a vertical plane containing a radius of the distribution hub points downward in the direction away from the center of the hub, ideally at such an angle as to be tangent to that portion of the bladder which is in contact with the straight portion of the lower sidewall of the tire, or if there is no such straight portion then with the point of inflection between the curved surfaces of the lower bead and the lower sidewall of the tire. The projection of the axes of the nozzles on a horizontal plane may either be colinear with radii of the distributor plate 32, or they may intersect those radii at any convenient acute angle so as to induce a circumferential swirling as well as radial swirling of the fluids in the curing cavity. Although the specific magnitudes of these angles will depend on the press construction and the sizes of tires being cured, the one requirement which is invariable is that in order to get the maximum effect the inclination of the nozzles axes must be such as to dispose the said axes substantially tangent to the downwardly curving lower bead and sidewall-contacting portion of the bladder, as indicated by the arrows S in FIG. 1. The steam jets entering the bladder through these nozzles will thus impart to the fluids in the bladder a circulatory motion having both a radial and a circumferential component or having merely a radial component, depending on whether the nozzles are non-radially or radially oriented.

The feeding of steam into the bladder B via the distributor plate 32 is regulated either in accordance with the bladder pressure conditions or in accordance with the cavity temperature conditions by a control arrangement 44 (see FIGS. 4 and 5), e.g. a remote-controlled valve, for the steam supply 28. This structure will be more specifically referred to presently.

The annular middle portion 45 of the upper surface of the distributor plate 32 slopes downwardly at an angle of about 5° to the horizontal and at its innermost edge merges substantially with the uppermost surface of the hub structure 17. The latter is provided with a relatively large drain opening 46 which communicates at its lower end with the bore 26, which is connected at its bottom and discharge and via a suitable fitting 47 to a flexible conduit 48 leading to a steam trap 49 of conventional construction.

The number of nozzles 39-40 provided in the peripheral flange 34 of the plate 32 may vary considerably, depending upon the sizes of the tires being produced and on the rate of admission of steam and filling of the cavity desired. Merely by way of example, for a tire in the 13" to 16" (rim size) range, tests have shown that 24 such nozzles, with the inserts 40 each having an internal diameter of about 0.058 to 0.060 inch and giving a total nozzle area of about 0.065 square inch, function very effectively. With a steam pressure of 200 p.s.i.g. maintained in the line 27-25, such a nozzle system can deliver about 5 lbs. of steam at sonic velocity in thirty seconds. This is considerably more than is necessary during the early part of the heating and curing cycle. A steam jet flow of about 600 to 700 feet per second has been found to be sufficient to achieve the turbulent flow conditions desired. The distributor plate 32 and especially the nozzle inserts 40 are made of any suitably corrosion-resistant, high-strength material, such as stainless steel.

The screen or straining member 41 is preferably a wire cloth made from 0.023 inch stainless steel or like corrosion-resistant wire which is sufficiently sturdy to withstand continued use and repeated handling. Suitable screens may be formed from wire having a diameter between about 0.015 and 0.030 inch, woven to between about 15 to 35 meshes per inch so as to have an open area between about 20% and 50%, and so as to have screen openings the diagonal dimensions of which are less than the associated nozzle diameter. The actual choice of any specific interrelated set of values of these parameters is in practice determined by the percentage of open screen area which will ensure the optimum combination of maximum filtering action with a minimum frequency of press shut-downs for cleaning of the filter screen.

In the operation of a tire press of the type herein referred to, when the upper mold half 12 descends into its closed position and the curing steam is admitted into the bladder B, the tire band T is conformed to the inner contours of the mold and cured therein. At the termination of the curing press cycle, the mold is opened. As the upper mold half is raised, the upper sidewall of the cured tire is stripped from the upper bead ring 19 and the inner surface of the upper mold half, and concurrently therewith the lower bead ring 14 is raised slightly relative to the lower mold half 11 (by the shaft 18 and associated elements) so as to strip the lower sidewall from the inner surface of the lower mold half. The tire is then removed from the press by any suitable mechanism (not shown) which constitutes no part of this invention.

During the steam curing portion of a curing cycle conducted in a standard tire press there is an initial rush of steam into the bladder until the pressure reaches the operating value. After this initial surge, some additional steam enters at relatively low velocity in order to maintain the operating pressure as condensation occurs. Only an insignificant portion of the condensate formed in the curing cavity is removed prior to the termination of the curing cycle. The major portion of the condensate, of course, has a tendency to collect in the lower part of the curing bladder, with the result that heat transfer through that portion of the bladder is seriously inhibited. As a result, the lower sidewall of the tire is not cured nearly to the same degree as the upper sidewall. This is illustrated graphically in FIG. 7 which depicts the cure of the upper and lower sidewalls of a standard 7.50 x 14 tire in a conventional 40-inch "Bag-O-Matic" press employing steam at 200 p.s.i.g. with a bladder temperature of 388° F. and a mold temperature of 321° F. As this is a plot of cure rate against time, the area under each curve represents the state of cure achieved by that particular segment of the tire. The curves labeled "Upper Sidewall" and "Lower Sidewall" show that after 13 minutes of the curing cycle, the inner surface of the lower sidewall reaches a state of cure of 26 arbitrary units, i.e. only about 20% as much as the upper sidewall which reaches a state of cure of 129 arbitrary cure units. The graph of FIG. 7 clearly shows the considerable difference between the curing rates of the upper and lower sidewalls which results from the presence of a pool of condensate.

These disadvantages and drawbacks of the known steam curing techniques and processes are eliminated by the present invention and more particularly through the use of the steam distributing arrangement hereinbefore described. In accordance with one aspect of the present invention, the curing method is characterized by the fact that the steam is admitted into the interior of the curing bladder through downwardly angled and nonradially oriented nozzles 39–40 in the distributor plate 32 in a manner regulated in accordance with the pressure conditions existing in the bladder. This is schematically illustrated in FIG. 4, wherein the control device 44 is indicated to be responsive to the bladder pressure via a signal line 44a, and operative to control the actuation of the steam supply 28 via a signal line 44b. It will be apparent that these signal lines may be either electric or pneumatic in nature.

In the practice of this process, therefore, it will be seen that even though some water enters the bladder at the beginning of the curing cycle when the steam lines are first opened, it does not have a chance to settle and stagnate in the bottom of the bladder since the orientations of the nozzles are such as to cause this water to swirl around the interior of the bladder. Moreover, the high velocity steam jets which enter the bladder at the same time are directed into the bottom region of the bladder, and thus both steam and water are circulated through the bladder both radially and circumferentially of the same. The steam in particular flows first downwardly and outwardly along the lower sidewall-contacting portion of the bladder, then upwardly along the crown and tread-contacting portion, and then back inwardly and downwardly along the upper sidewall-contacting portion. This flow of steam is, consequently, highly turbulent and creates a violent mixing action on the water and on any subsequently formed condensate. This not only tends to divide the liquid up into small droplets but also tends to disrupt any film of condensate that may have formed or remained on any part of the bladder surface. Some of the circulating liquid is caused to stream onto the upper surface of the distributor plate 32 from where, due to the presence of the downwardly sloping section 45, it flows directly into the drain opening 46 and thence to the steam trap 49. With the drain ducts 46 and 26, which are disposed in the hub structure 17, being out of thermal contact with the steam line 27–25 and with any part of the tire being cured, however, the condensate flowing through these ducts has no effect on the tire or its cure, and the presence of the steam trap 49 ensures that no steam is lost from the bladder except through normal condensation.

It is deemed advisable to emphasize at this point that the aforesaid advantageous features of the instant curing process are directly the results of the admission of the curing steam into the bladder cavity in the form of a multiplicity of downwardly oriented high velocity jets formed by a corresponding number of circumferentially spaced nozzles the axes of which are tangent to the locus of the points of inflection between the upwardly convex curvature of the lower bead and the upwardly concave curvature of the lower sidewall. By virtue of this arrangement, the steam jets impinge on any pool of liquid, i.e. condensate, that may have accumulated in the bottom region of the bladder while in a state of substantially maximum flow velocity and substantially maximum kinetic energy. The greatest part of this energy is, consequently, available for and expended in the dispersion of such a pool and any films of condensate and in the prevention of the formation of stagnant pools and continuous films of condensate, thereby enabling a maximum transfer of heat through the lower portion of the bladder. Where, over and above this, the steam inlet nozzles are disposed so that their axes are oriented not only downwardly but also non-radially relative to the bladder, the dispersion of pools and films of condensate is achieved the same as above, but the action of the steam jets which leads to this result is considerably more complex and brings about a compound movement of all fluids in the bladder. Such compound movement has a radial as well as a circumferential component, whereby the said fluids, i.e. the steam and the dispersed droplets of liquid, are circulated through the cavity in a swirling manner.

The effectiveness of the curing process in accordance with this embodiment of the present invention is graphically illustrated in FIG. 8 which is also the plot of a curing cycle for a 7.50 x 14 tire in a 40-inch "Bag-O-Matic" press operated at a mold temperature of 321° F., a bladder temperature of 388° F., and a steam pressure of 200 p.s.i.g. As clearly shown in FIG. 8, the curing by means of regulated steam addition in conjunction with continuous condensate dispersal results in the lower sidewall of the tire being cured to a value of 111 while the upper sidewall is cured to a value of 90 (expressed in the same arbitrary cure units as were referred to in connection with FIG. 7). Although the lower sidewall is cured to a slightly greater extent than the upper sidewall, which may be explained by the fact that the steam jets are initially directed at the lower sidewall, the two cures differ from one another by less than 20%, as distinguished from the cures attainable by the known processes which differ from one another by as much as 80% or more. The graph also shows that the cure rates for both sidewalls are approximately the same. The quality of the resultant tire, i.e. the uniformity of cure in the two sidewalls is, therefore, considerably higher than anything which has been attainable heretofore by following the known steam curing techniques.

In accordance with another aspect of the present invention, it is contemplated that the curing steam may be pulsed into the bladder in lieu of being continuously fed thereinto at the operating pressure sought to be maintained with the bladder. To this end, the pressure of the steam supply 28 is set at a higher value than the bladder pressure, so as to create a pressure differential ranging from about 20 p.s.i.g. on up. Thus, for a bladder pressure of 200 p.s.i.g. the pressure in the steam supply may, for example, be set at 250 p.s.i.g. or higher, although pressures as low as 220 p.s.i.g. could be used. In this process, it is preferred to effect the introduction of steam into the curing bladder with the aid of a control device 44 which is responsive to the temperature conditions existing within the bladder. This is achieved by the mounting in the fluid stream one or more temperature-sensitive elements 50.

In the operation of this system it will be understood that during the course of each curing cycle, as condensate is formed, the temperature in the bladder cavity tends to fall. Whenever this occurs, say if the bladder temperature falls below the aforesaid value of 388° F., a signal is applied by the element 50 through the line 44a to the steam control 44. The latter may be a valve adapted to be operated by a solenoid when the same is energized to open the steam line 27 and to permit new steam from the supply 28 to be pulsed into the bladder due to the pressure differential existing between the supply and the bladder. For any given complete curing cycle carried out in accordance with this embodiment of the present invention, it is found that during the first minute or so of the cycle, which in essence constitutes the filling period, the control demands an almost continuous flow of steam into the cavity, but thereafter the pulse rate lessens to about 5 to 20 pulses per minute for the remainder of the cycle.

This form of the curing process thus does not make use of an absolutely continuous steam addition, but it will be recognized that even at a relatively low pulse rate of about 10 pulses per minute there is a lag of only about 5 or 6 seconds between successive pulses. Consequently, the condensate still has no chance of settling into a heat transfer-inhibiting stagnant pool in the lower portion of the curing bladder, and actually even between pulses the condensate remains in the form of moving, dispersed droplets. This is due to the fact that despite some attenuation of the turbulence conditions in the bladder between pulses, these recur so frequently that there is never even a partial stagnation of the fluids in the bladder. Stated in other words, even though the mixing action is most violent at the start of each pulse, the swirling motion of the steam and condensate is never interrupted, not even at the instant just prior to the start of the next pulse. Tests have shown that the use of the steam pulsing technique according to this embodiment of the present invention keeps the bottom of the bladder clear of stagnant condensate and leads to tire cures which are comparable to, and generally better than, the cures represented by FIG. 8.

As is well known, in the manufacture of tires some small quantities of air are always trapped between the various plies of the tire band as the same is built up on the tire building drum. As a result, small pockets of air, which are not eliminated by the elevated curing temperatures employed, remain in the body of the finished tire between the plies thereof. In addition, it is also found that during the curing operation some of the volatile components of the vulconizing agents and of the adhesive compositions employed in binding the plies together are liberated. These small quantities of vapors also remain trapped in the body of the tire below the sidewall and tread stocks, and expand when subjected to the high curing temperatures, as a result of which they exert appreciable separating forces on the plies of the tire. Although even under these conditions the presence of such bubbles or pockets of gases and vapors is in general not too objectionable, it does constitute a defect in the tire which could result in shortening the useful life thereof.

In accordance with a further aspect of the present invention, therefore, the curing processes herein disclosed may be modified somewhat to permit the trapped quantities of air and volatiles to be eliminated by causing them to be dissolved under high pressure in the rubber compositions of which the tread and sidewalls of the tire are made, and to enable the aforesaid separating forces of the expanding gases to be counteracted. In essence this is achieved by raising the pressure in the curing bladder, at a predetermined point of time in the curing cycle, to a value considerably higher than the normal steam pressure without concomitantly increasing the temperature in the bladder.

As will be clear to those skilled in the art, however, it is impossible to accomplish the required pressure rise by simply raising the steam pressure in the bladder, since that cannot be done without also raising the steam temperature, which could lead to overcuring and perhaps scorching and depolymerization of the tires being cured. To overcome this disadvantage, the present invention contemplates the admission into the curing bladder, at a predetermined time interval after the start of the curing cycle, of a predetermined quantity of an inert and non-condensable gas, the sole function of which is to raise the total pressure in the bladder without raising the steam pressure. Merely by way of example, such gases as nitrogen and flue gas are found to be effective for this purpose. The extent to which the pressure in the bladder is raised by the inert gas will effectively depend, subject to limitations imposed by the structural characteristics of the mold and the curing bladder, on the magnitude of the pressure required to enable the trapped quantities of air and volatiles to be dissolved in the rubber sidewall and tread stocks.

It should be noted that the foregoing procedure does not involve merely the use of relatively static mixtures of saturated steam and non-condensable gases as heating media having temperatures lower than that which corresponds to saturated steam at the desired operating pressure. It has been found that when such a heating medium is maintained at low or no velocity, the rate of heat transfer from the said medium rapidly diminishes. This phenomenon is known as the "plating out" effect. It is believed to be due to the fact that as any given portion of the fluid mixture which is closest to the heat transfer surface gives up its heat to that surface, the steam in that portion of he fluid condenses leaving a film of fluid rich in the non-condensable component. This films acts as an excellent insulator, reducing the rate of heat flow from the bulk of the fluid mixture.

In the method of the instant invention, the heat transfer fluid is a dynamic mixture kept in a constant state of turbulence, which serves to minimize or eliminate "plating out" by a substantially continuous destruction of any such film which might tend to form and thus to assure a continued high rate of heat transfer from the curing fluid to the curing bladder.

Referring to FIG. 5, the apparatus there shown diagrammatically includes means for controlling the admission of the inert gas from the supply 30 thereof to the steam line 27 via the gas line 29. To this end, a valve 51 adapted to be operated by a solenoid 52 is incorporated in the conduit 29. The energization of the solenoid is controlled by a timing device 53 of any suitable construction. Preferably, the device is set to cause the valve 51 to open at an intermediate point of the curing cycle, for example after a lapse of about 2 minutes, so as to admit the desired predetermined or metered quantity of the inert gas into the curing bladder. The precise quantity of such gas which is required for any specified pressure increase can be easily calculated from known pressure, volume and temperature relationships and gas constants. In actual practice, the pressure in the bladder may be raised by an amount ranging from as little as 20 p.s.i.g. to as much as 150 p.s.i.g. or more, if desired. Thus, if the normal steam curing pressure is 200 p.s.i.g. (approximately 215 lbs. absolute), and the pressure required to dissolve any trapped air or vapors is 340 lbs. absolute, then enough gas must be admitted to ensure that its partial pressure will be 125 lbs. absolute. Irrespective of the total pressure increase, of course, the partial pressure of the steam remains at 200 p.s.i.g.

A tire cure carried out in accordance with the process according to this embodiment of the present invention is graphically illustrated in FIG. 9. This graph too is the plot of a curing cycle for a 7.50 x 14 tire in a 40-inch "Bag-O-Matic" press with a bladder temperature of 388° F., a mold temperature of 321° F., and a starting normal steam pressure of 200 p.s.i.g. For the first two minutes of the cycle, the initial steam pressure was maintained by pulsing additional steam from a supply maintained under a pressure of 250 p.s.i.g., as demanded by the temperature-sensitive means 50 positioned in the steam flow path leading to the bladder cavity. At the 2-minute mark, the bladder pressure was increased to 220 p.s.i.g. by the addition of a predetermined quantity of nitrogen. The graph in FIG. 9 shows that (as in the case of the steam pulsing cure represented by FIG. 8) the cure rates of the two sidewalls were substantially the same over the entire curing cycle, and that at the 13-minute mark the lower sidewall had been cured to a value of 150 while the upper sidewall had been cured to a value of 126 (again expressed in the arbitrary cure units first referred to hereinbefore in connection with FIG. 7), which is a difference of only 16%.

The elevation of the pressure as aforesaid causes all trapped air to be dissolved, helps to knit the interior of the tire together to overcome the separating pressure of the vapors released from the carcass cords, vulcanizing ingredients, adhesives, etc., and also minimizes the surface defects that occur when the tire is not forced into the mold with adequate pressure. As a result, the strength of the finished tire is appreciably greater than the strength of tires made in accordance with standard procedures, and the possibility of ply separation of the tire during use is materially lessened.

Still another advantage accruing from the implementation of the principles of the present invention is that at the termination of the curing cycle the tire is at a considerably lower temperature than has heretofore been possible.

More specifically, in the standard single-admission steam curing procedures, the temperature build-up in the tire is relatively gradual and reaches its maximum point near the end of the cycle. Thus, when the mold is opened, both the tire and the mold are substantially at their highest temperatures. This is illustrated graphically by the broken-line curve in FIG. 6 which represents the variation of temperature with time during a standard curing cycle. Since the opening of the mold at this high temperature is either accompanied or immediately preceded by a relatively sudden decrease of pressure, such water or moisture as was initially and inherently contained in the carcass cords is permitted to boil and become vaporized into steam. This, as will be readily understood, may have a highly deleterious effect on the tire and could render it defective and unfit for commercial use.

In contradistinction to the foregoing, the pressure-responsive regulated or temperature-responsive pulsed addition of steam, with the added increase of the bladder pressure by the admission of an inert gas during the cycle, permits the maximum curing temperature to be reached at an intermediate point of the cycle and further permits the temperature to be gradually decreased over the latter half of the cycle. This manner of temperature variation with time is graphically illustrated by the solid-line curve in FIG. 6. As a result, when the mold is opened and the pressure suddenly lowered, the temperature of the tire is already sufficiently low that under the then remaining pressure no boiling of the moisture in the cords can occur. Production of tires defective in the manner described above is, therefore, effectively eliminated.

Figure 6:
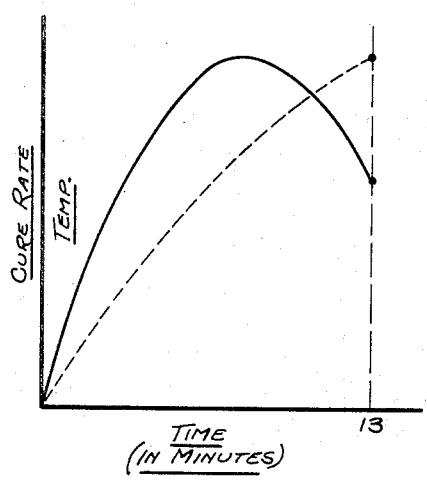
FIG. 6 is a graphic illustration of the differences between curing cycle end temperatures achieved by the curing processes of the present invention and those known heretofore.

That this lowering of temperature prior to the end of the curing cycle has no adverse effect on the cure of the tire is also graphically illustrated by FIG. 6. The total cure of the tire at the 13-minute mark in either case is represented by the area beneath the respective curve. Inasmuch as the solid line rises faster initially than the broken line, it is clear that a given state of total cure can be reached faster by the method of the invention, than by the standard steam cure.

Referring now specifically to FIG. 3, the tire press 54 there illustrated only in part is of the type manufactured and sold by the National Rubber Machinery Company under the trademark "Autoform." Such a press includes a lower mold half 55 mounted on a base 56, and an upper mold half 57 mated to the lower mold half, the upper mold half 57 being mounted for reciprocal movement toward and away from the lower mold half 55 under the action of a suitable mechanical linkage (not shown). A lower bead ring 58 is secured to the lower mold half 55 at the inner periphery thereof and has a face 58' contoured to provide a seat for the lower bead 15 of the tire T being cured. Correspondingly, an upper bead ring 59 is associated with the upper mold half 57 to provide a seat for the upper bead 20 of the tire, the ring 59 being secured to a structure 60 by means of which it may be moved downwardly away from the upper mold half for stripping the cured tire therefrom. The base 56 of the press 54 is further provided centrally of the lower mold half with a well structure 61 having at its top end an open mouth 61' defined by an outwardly curved flange 62.

The upper region of the well 61 is double-walled to define an annular passageway or manifold 63 which extends into the flange 62 and there communicates with the uppermost ends of a plurality of nozzles 64 the axes of which are oriented in a manner to be more fully described presently. The outer wall portion 63' of the well 61 adjacent the flange 62 is disposed opposite the lower bead ring 58 and coacts with the latter to clamp therebetween in a fluid-tight manner one end 65 of the bladder B' the other end 66 of which is closed and adapted to seat against the member 60 to which the upper bead ring 59 is connected. In all other respects, i.e. as to flexibility, imperviousness, heat transfer properties, and function, the bladder B' is identical with the bladder B shown in FIG. 1.

Secured to the inner surface of the well 61 is a channel member 67 which defines a passageway 68 communicating at its upper end with the manifold 63 and at its lower end with a steam line 69. The line 69 is connected, in the same manner as the steam line 27 in FIG. 1, with a steam supply 28 (FIG. 4) or with a steam supply 28 and an inert gas supply 30 (FIG. 5).

The nozzles 64 are spaced from one another in the flange 62 circumferentially of the latter. As clearly shown in FIG. 3, the axes of the nozzles are angled downwardly relative to the horizontal so as to be substantially tangent to the inner surface of the bladder B' where the latter overlies the locus of the points of inflection between the convex curvature of the lower bead and the concave curvature of the lower side wall of the tire T. Thus, when steam is fed into the manifold 63 from the supply 28, it leaves the manifold in the form of a plurality of high velocity jets which are directed, as indicated by the arrow S, into the lower region of the bladder cavity. The functioning of these steam jets in dispersing condensate, by virtue of being incident thereonto while having substantially their maximum flow velocity and kinetic energy, is the same as that of the steam jets previously described herein in connection with the press 10 in FIG. 1. Correspondingly, the axes of the nozzles 64 may be oriented radially of the bladder cavity. If, however, it is desired to impart to the fluids in the said cavity a circulatory movement having both radial and circumferential components, then the axes of the nozzles must be oriented non-radially of the bladder cavity. It will be apparent that the nozzle diameters of the distribution means shown in FIG. 3 may be varied by providing nozzle inserts of suitable cross-sections in the manner illustrated in FIG. 1. Also, if desired a filter screen may be provided in the manifold 63, corresponding to the filter 41 in FIG. 1.

As will be readily understood, the processes of the present invention, involving either a regulated steam addition, or a pulsed steam addition, or a steam addition supplemented by the introduction of a predetermined quantity of a non-condensable, inert gas into the bladder during the curing cycle, may be carried out by means of the apparatus illustrated in FIG. 3 in the same manner as by means of the apparatus illustrated in FIGS. 1 and 2. A specific description of such processes in connection with FIG. 3 is, therefore, not deemed necessary herein.

The processes of the present invention, in addition to leading to the production of more uniformly cured and stronger tires than the known steam curing procedures, further enable the overall curing time per tire to be appreciably reduced, whereby the production capacity of the tire manufacturing plant making use of these processes (irrespective of the type of presses employed) is substantially enhanced, while at the same time the overall production costs are substantially lessened. The entire production is, accordingly, more economical to both the manufacturer and the consumer.

It will be understood that the foregoing detailed description of various embodiments of the present invention is intended to be illustrative only and that many variations and substitutions of equivalents can be made in the procedural steps, ranges and characteristics of operating conditions and components, and apparatus features disclosed herein without any departure from the spirit and scope of the present invention as defined in the appended claims.

Having thus described my invention, what I claim and desire to protect by Letters Patent is:

1. In the process of steam-curing a tire; the improvement comprising the step of admitting into the geometric confines of the tire, while the same is being shaped in a mold, steam in the form of a plurality of high velocity jets distributed around the entire circumference of the radially innermost section of the mold and oriented at a downward angle to the horizontal with their respective flow paths substantially tangent to the inner surface of the tire in the region of confluence of the lower bead and sidewall thereof, thereby causing the steam initially to enter into the lower portion of the tire and come into contact with condensate while still at substantially maximum flow velocity and kinetic energy so as to disperse such condensate into small and discrete moving droplets incapable of interfering with the transfer of heat from the steam to the tire.

2. In the process of steam-curing tires in a press equipped with a steam-receiving curing bladder; the improvement comprising the step of admitting steam into the geometric confines of said bladder in the form of a plurality of high velocity jets distributed around the entire circumference of the radially innermost section of the toroidally shaped bladder and oriented at a downward angle to the horizontal with their respective flow paths substantially tangent to the inner surface of said bladder where the same contacts the region of confluence of the lower bead and sidewall of the tire being cured, thereby causing the steam initially to enter into the lower portion of said bladder and come into contact with condensate while still at substantially maximum flow velocity and kinetic energy so as to disperse such condensate into small and discrete moving droplets incapable of interfering with the transfer of heat from the steam to the bladder.

3. In the process of claim 2; the admission of steam into said bladder comprising pulsing the steam repeatedly into the interior of said bladder from a source of supply of steam maintained under a pressure higher than the operating pressure desired in said bladder.

4. In the process of claim 3; the further step of admitting into said bladder, at an intermediate point of the curing cycle, a predetermined quantity of a non-condensable gas sufficient to raise the total operating pressure in said bladder without raising either the pressure or the temperature of the steam in said bladder, the subsequently entering steam jets disturbing said gas and maintaining it in a turbulent condition sufficient to minimize the plating out effect and maintain a maximum rate of heat transfer to said bladder.

5. In the process of claim 2; the orientation of said high velocity jets being such that said flow paths are oriented both at a downward angle to the horizontal and non-radially of said bladder, whereby the steam jets act to circulate the dispersed water and condensate both radially and circumferentially through said bladder.

6. In the process of steam-curing tires in a press equipped with a curing bladder adapted to receive the steam under pressure; the improvement comprising the steps of continuously sensing decreases in the pressure of the steam in said bladder during the curing cycle to below a preselected operating value, continuously and in response to the sensed pressure decreases supplying additional steam to said bladder from a source of supply of steam maintained under a pressure substantially equal to the desired operating pressure for returning the steam pressure in said bladder to said operating value thereof, and admitting said steam into said bladder both initially and in response to sensed pressure decreases in the form of a plurality of high velocity jets distributed around the entire circumference of the radially innermost section of the tire being cured and oriented both at a downward angle to the horizontal and non-radially of said bladder, said steam jets entering into the lower portion of said bladder along, respective flow paths substantially tangent to the portion of the bladder wall which contacts the region of confluence of the lower bead and sidewall of the tire, and the steam swirling through said bladder and coming into contact with condensate in the latter while still at substantially maximum flow velocity and kinetic energy to disperse the condensate into small and discrete moving droplets incapable of inhibiting heat transfer from the steam to said bladder.

7. In the process of steam-curing tires in a press equipped with a curing bladder adapted to receive the steam under pressure; the improvement comprising the steps of continuously sensing decreases in the temperature of the steam in said bladder during the curing cycle to below a preselected operating value, repeatedly and in response to the sensed temperature decreases pulsing additional steam to said bladder from a source of supply of steam maintained under a pressure between about 20 and 200 p.s.i.g. higher than the desired operating pressure for returning the steam pressure in said bladder to the operating value thereof, and admitting the steam into said bladder both initially and in response to sensed temperature drops in the form of a plurality of high velocity jets distributed around the entire circumference of the radially innermost section of the tire being cured and oriented both at a downward angle to the horizontal and non-radially of said bladder, thereby directing said steam jets into the lower portion of said bladder along flow paths substantially tangent to the portion of the bladder wall which contacts the region of confluence of the lower bead and sidewall of the tire so that the steam swirls through said bladder with a motion having both radial and circumferential components and disperses any condensate in said bladder into small and discrete moving droplets incapable of inhibiting heat transfer from the steam to said bladder.

References Cited

UNITED STATES PATENTS

| Re. 22,188 | 9/1942 | Minor | 264—315 X |
| 1,627,785 | 5/1927 | Krall | 264—315 |
| 1,757,053 | 5/1930 | Minor | 264—347 X |
| 2,846,722 | 8/1958 | Soderquist. | |
| 2,938,100 | 5/1960 | Gibbs. | |
| 2,997,740 | 8/1961 | Soderquist. | |

ROBERT F. WHITE, *Primary Examiner.*

ALEXANDER H. BROADMERKEL, *Examiner.*

R. B. MOFFITT, *Assistant Examiner.*